Patented Aug. 7, 1945

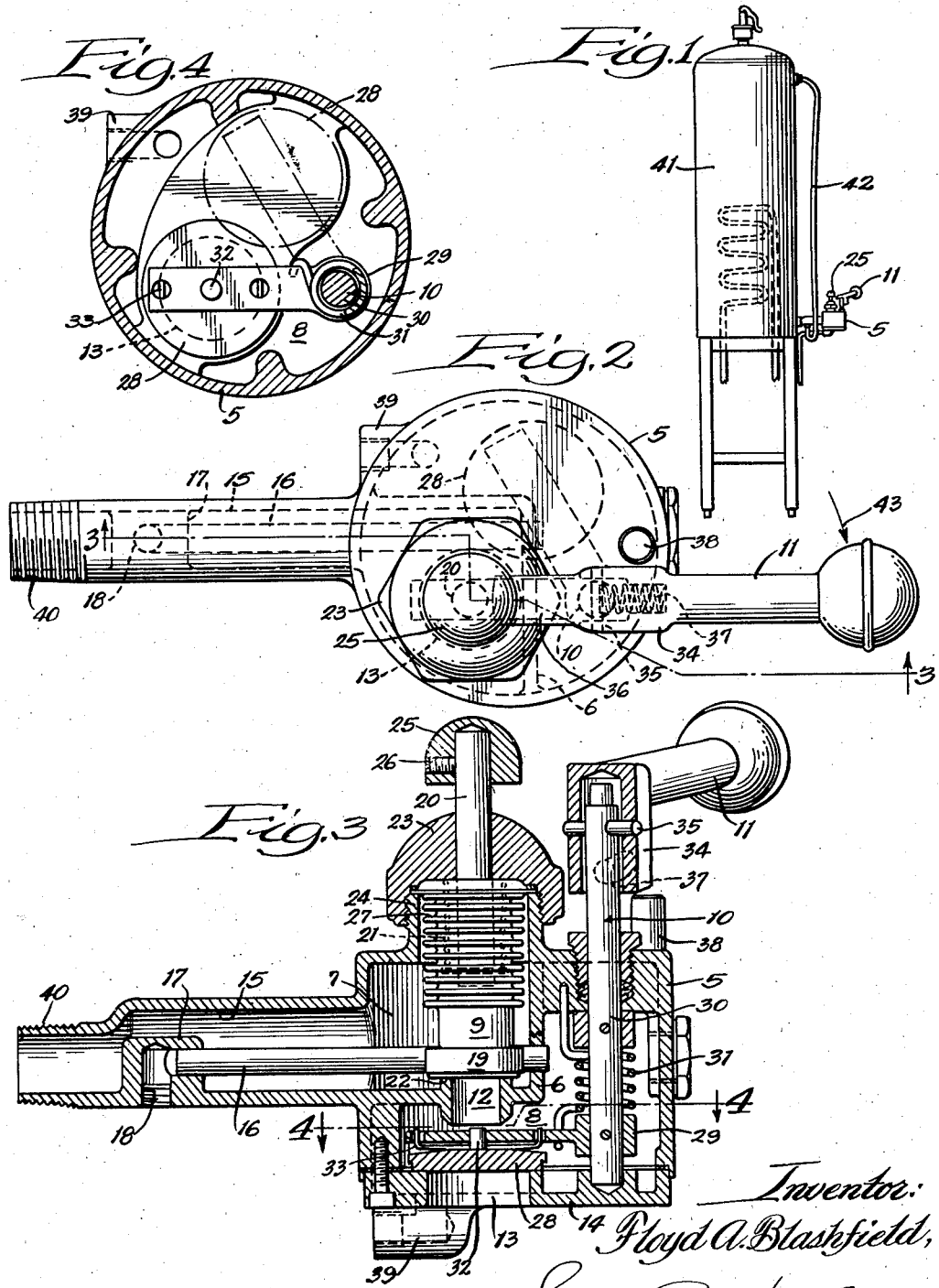

2,381,031

UNITED STATES PATENT OFFICE 2,381,031

STERILE DRAWOFF FAUCET

Floyd A. Blashfield, Madison, Wis., assignor, by mesne assignments, to Air Reduction Company, Incorporated, a corporation of New York Application May 3, 1944, Serial No. 533,941

10 Claims. (Cl. 277—20)

Sterilization equipment to be acceptably effective requires the maintenance of sterility of all of the channels through which the sterile fluid is required to flow from the sterilizer to the receptacle wherein it is collected for use. Heretofore, this has presented the problem of providing a suitable draw-off faucet which could be kept sterile and which, at the same time, could be conveniently operated. The patent of Floyd A. Blashfield, No. 2,094,056, dated September 28, 1937, discloses a draw-off faucet designed to surmount this problem. However, the structure shown in this patent is difficult of operation and accordingly has not met with any extended use.

The main objects, therefore, of this invention are to provide an improved construction of a draw-off faucet for sterilization equipment which insures a continuously-effective sterilization of all parts thereof so that a sterile fluid is always instantly available through a sterilized outlet; to provide an improved valve control mechanism for a sterile draw-off faucet of this kind capable of convenient single-handed operation; and to provide an improved sterile draw-off faucet especially adapted for use in connection with an extended sterile distribution system so as to permit the drawing off of sterile fluid at points remote from the sterilizer.

In the specific embodiment shown in the drawing, Figure 1 is an elevation of a sterilizer equipped with this improved form of draw-off faucet;

Figure 2 is an enlarged plan view of the improved draw-off faucet, the operating handle being shown in the position to which it is shifted for opening the faucet;

Figure 3 is a vertical section of the same taken on the line 3—3 of Figure 2; and Figure 4 is a horizontal sectional view taken on the line 4—4 of Figure 3.

A draw-off faucet constructed in accordance with this invention comprises a housing 5 wherein is formed a partition 6 dividing the interior into two compartments or chambers 7 and 8. From the former of these chambers, the flow of a sterile fluid is controlled by means of valve mechanisms 9 and 10 retractable through the operation of a handle 11 so as to open the normally closed port 12 in the partition 6 and housing-outlet 13 formed in a housing closure 14. Sterile fluid is admitted to the chamber 7 through a stem 15 integral with the housing 5 whereas a sterilizing medium is admitted to the chamber 8 through a tube 16, the inner end of which extends through the partition 6 and the outer end of which is supported in a channeled knob 17 formed in the tube 15 and having an inlet 18 communicating with said tube 16.

The valve mechanism 9 comprises a valve member 19 carried by a stem 20 and urged by a spring 21 to rest on a valve seat 22 thus closing the port 12 through the partition 6. The stem 20 is slidably supported in a cap 23 screwed onto a threaded head 24 on the housing 5 and has a knob or head 25 secured on the upper end thereof by means of a set screw 26. A bellows 27 encloses the valve stem 20 and spring 21 so as to prevent contact thereof with the sterile fluid in the chamber 7.

The valve mechanism 10 comprises a disc valve member 28 carried on an arm 29 keyed to a shaft 30 rotatably mounted in the housing 5. A torsion spring 31 normally actuates the shaft 30 to shift the disc valve member 28 into position to close the outlet 13. A pin 32 on the disc 28 extends through an aperture in the arm 29 and a spring 33 interposed between the disc 28 and arm 29 forces the disc into firm contact with the inner surface of the housing closure 14.

The handle 11 is provided with a bifurcated head 34 whereby it is pivoted at 35 on the upper end of the shaft 30 so that a lug or extension 36 on the handle is adapted to come into position under the knob or head 25 of the valve stem 20, when the handle 11 is shifted horizontally against the action of the spring 31, for the purpose of later retracting the disc valve 28 from the outlet 13. When the handle is subsequently depressed vertically, the extension 36 engages the head 25 and retracts the valve member 19 against the action of the spring 21. A spring 37 arranged in a recess on the handle-head 34 bears against the shaft 30 and normally lifts the outer end of the handle 11 so that the extension 36 is held out of position to engage the knob 25 on the valve stem 20.

A pin 38 located on the outer rim of the housing 5 engages the underside of the handle head 34 and prevents the vertical shifting thereof on the pivot 35 except when the handle is in the position to which it has been first shifted horizontally for retracting the valve member 28 and bringing the extension 36 into position for engagement with the knob or head 25 on the valve stem 20.

As will be noted from the drawing, the outlets or ports 12 and 13 are arranged in axial alignment. Thus the sterile fluid, when the valve mechanisms 9 and 10 are retracted, will pass directly through the outlet 13 with little or no contact with the peripheral portion of the closure 14. Also, it will be noted that the closure 14 is provided with a drain opening 39 which would be connected by a suitable conduit with a steam trap, not shown.

The stem 15 is threaded at 40 so that the device may be screwed into a suitable fitting either on the sterilizer 41 or forming a part of a sterile distribution system such as disclosed in copending application of Robert H. Schneider, Serial No. 544,993, filed July 14, 1944.

The port 18 formed in the lug 17 of the stem 15 is connected by means of a conduit 42 to a sterilizing medium. As shown in Figure 1, this sterilizing medium is derived from the sterilizer 41. The connection could be made to some other source of sterilizing medium.

The operation of the device herein shown is as follows.

Normally, the spring 21 and the springs 31 and 33 hold the valve members 19 and 28, respectively, in position to close the port 12 and outlet 13. A sterile fluid flows in through the stem 15 into the chamber 7. A sterilizing medium flows through the inlet port 18 and the tube 16 into the chamber 8. Accordingly, the fluid in the stem 15 and chamber 7 is kept sterilized and the chamber 8 and all of the parts therein likewise are kept in a condition of sterilization.

When a hospital or clinic attendant desires a quantity of sterile fluid, a receptacle for receiving the fluid may be held in one hand and, with the other hand, the attendant shifts the handle 11 horizontally in the direction of the arrow 43 (see Figure 2). This rotates the shaft 30 and swings the arm 29 to retract the disc valve member 28 and uncovers the outlet 13. When the handle reaches the limit of its horizontal movement, the head 34 has been moved out of contact with the pin 38, and the lug or extension 36 has been brought into position under the head or knob 25 on the valve stem 20. Thereupon, the attendant depresses the handle 11 in a vertical plane causing the lug or extension 36 to engage the head or knob 25 and elevate the valve member 19. This retracting of the valve member 19 permits the sterile fluid to flow out through the aligned ports 12 and 13 into the container held by the attendant.

As soon as the desired quantity of the sterile fluid has been obtained, the attendant releases the handle 11. Thereupon, the spring 37 elevates the handle so as to retract the lug or extension 36 and at the same time elevate the head 34 above the pin 38. Instantly, the spring 21 will snap the valve member 19 back onto the seat 22, closing off communication between the chamber 7 and the aligned outlets 12 and 13. As soon as the handle 11 has been fully elevated by the spring 37, so that it clears the pin 38, the torsion spring 31 acts to rotate the shaft 30 so as to swing the handle 11 in a horizontal plane opposite the direction of the arrow 43 and move the disc valve member 28 into position to close the outlet 13.

Changes in the described structure may be made without departing from the spirit of the invention, the scope of which should be determined by reference to the following claims, the same being construed as broadly as possible consistent with the state of the art.

I claim:

1. A faucet of the class described comprising a housing partitioned to provide two chambers connected by an opening through said partition, separate inlet conduits connected to said chambers, said housing having an outlet leading from one of said chambers, valves controlling said partition opening and said housing outlet, and a handle mounted on said housing operable to unseat said valves for opening communication between the other of said chambers and said housing outlet.

2. A faucet of the class described comprising a housing partitioned to provide two chambers connected by an opening through said partition, separate inlet conduits connected to said chambers, said housing having an outlet leading from one of said chambers, valves normally actuated to close said partition opening and said housing outlet, and a handle mounted on said housing and operable to retract said valves seriatim so as to first open said housing outlet and subsequently open communication between said outlet and the other said chamber through said partition opening.

3. A faucet of the class described comprising a housing partitioned to provide two chambers connected by an opening through said partition, separate inlet conduits connected to said chambers, said housing having an outlet leading from one of said chambers, an axially shiftable valve normally actuated to close said partition opening, a radially shiftable valve normally actuated to close said housing outlet, and a handle horizontally shiftable on said housing so as to retract said housing-outlet valve and subsequently vertically shiftable so as to retract said partition-opening valve and open communication between the other said chamber and said housing outlet.

4. A faucet of the class described comprising a housing partitioned to provide two chambers connected by an opening through said partition, separate inlet conduits connected to said chambers, said housing having an outlet leading from one of said chambers, an axially shiftable valve normally actuated to close said partition opening, a radially shiftable valve normally actuated to close said housing outlet, and a handle rotatably mounted on said housing and connected to retract said housing-outlet valve, said handle being pivotally connected to said rotatable mounting so as to engage and retract said partition-opening valve and open communication between the other said chamber and said housing outlet.

5. A faucet of the class described comprising a housing partitioned to provide two chambers connected by an opening through said partition, separate inlet conduits connected to said chambers, said housing having an outlet leading from one of said chambers, a valve member for said partition opening having its stem axially shiftable in said housing and extending to the exterior thereof, a shoulder formed on said stem externally of said housing, yielding means normally urging said valve member to close said partition opening, a valve member for said housing outlet mounted on a radially swingable arm, a shaft rotatably mounted in said housing and connected to swing said arm, yielding means normally urging said shaft to swing said arm to cause said valve member to close said housing outlet, and a handle hinged on said shaft and having an extension adapted to be brought into alignment with the shoulder on said first-mentioned valve stem through the movement of said handle for retracting said housing-outlet valve member, said extension being engageable with said first-mentioned valve stem shoulder when said handle is tilted on said shaft so as to retract said first-mentioned valve member for opening communication between the other said chamber and said housing outlet.

6. A faucet of the class described comprising a housing partitioned to provide two chambers connected by an opening through said partition, separate inlet conduits connected to said chambers, said housing having an outlet leading from one of said chambers, a valve member for said partition opening having its stem axially shiftable in said housing and extending to the exterior thereof, a shoulder formed on said stem externally of said housing, yielding means normally urging said valve member to close said partition opening, a valve member for said housing outlet mounted on a radially swingable arm, a shaft rotatably mounted in said housing and connected to swing said arm, yielding means normally urging said shaft to swing said arm to cause said valve member to close said housing outlet, a handle hinged on said shaft and having an extension adapted to be brought into alignment with the shoulder on said first-mentioned valve stem through the movement of said handle for retracting said housing-outlet valve member, said extension being engageable with said first-mentioned valve stem shoulder when said handle is tilted on said shaft so as to retract said first-mentioned valve member for opening communication between the other said chamber and said housing outlet, and yielding means interposed between said housing-outlet valve member and said arm for seating said valve member to close said housing outlet.

7. A faucet of the class described comprising a housing partitioned to provide two chambers connected by an opening through said partition, separate inlet conduits connected to said chambers, said housing having an outlet leading from one of said chambers, a valve member for said partition opening having its stem axially shiftable in said housing and extending to the exterior thereof, a shoulder formed on said stem externally of said housing, yielding means normally urging said valve member to close said partition opening, a valve member for said housing outlet mounted on a radially swingable arm, a shaft rotatably mounted in said housing and connected to swing said arm, yielding means normally urging said shaft to swing said arm to cause said valve member to close said housing outlet, a handle hinged on said shaft and having an extension adapted to be brought into alignment with the shoulder on said first-mentioned valve stem through the movement of said handle for retracting said housing-outlet valve member, said extension being engageable with said first-mentioned valve stem shoulder when said handle is tilted on said shaft so as to retract said first-mentioned valve member for opening communication between the other said chamber and said housing outlet, and yielding means interposed between said handle and shaft for normally retracting said handle extension from engagement with said valve-stem shoulder.

8. A faucet of the class described comprising a housing partitioned to provide two chambers connected by an opening through said partition, separate inlet conduits connected to said chambers, said housing having an outlet leading from one of said chambers, a valve member for said partition opening having its stem axially shiftable in said housing and extending to the exterior thereof, a shoulder formed on said stem externally of said housing, yielding means normally urging said valve member to close said partition opening, a valve member for said housing outlet mounted on a radially swingable arm, a shaft rotatably mounted in said housing on an axis parallel to said first-mentioned valve stem and connected to swing said arm, yielding means normally urging said shaft to swing said arm to cause said valve member to close said housing outlet, a handle hinged on said shaft and having an extension adapted to be brought into alignment with the shoulder on said first-mentioned valve stem through the horizontal movement of said handle for retracting said housing-outlet valve member, said extension being engageable with said first-mentioned valve stem shoulder when said handle is tilted vertically on said shaft so as to retract said first-mentioned valve member for opening communication between the other said chamber and said housing outlet, yielding means interposed between said handle and shaft for normally retracting said handle extension from engagement with said valve-stem shoulder, and a shoulder on said housing adapted to engage said handle to secure it against vertical movement on said shaft except when said handle has been shifted horizontally to bring said handle extension into position to engage said valve-stem shoulder.

9. A sterile draw-off faucet comprising a housing partitioned to provide two chambers connected by an opening in said partition, said housing having an outlet leading from one of said chambers, valves normally urged to close said partition opening and said housing outlet, a pair of parallel conduits one of which is secured to said housing and opens into said other housing chamber and the other of which extends through said other chamber and opens into said one chamber, and means mounted on said housing and operable to actuate said valves to open communication between said other chamber and said housing outlet.

10. A sterile draw-off faucet comprising a housing partitioned to provide two chambers connected by an opening in the bottom of said partition, said housing having an outlet leading from one of said chambers in axial alignment with said partition opening, valves normally urged to close said partition opening and said housing outlet, a pair of parallel conduits one of which is secured to said housing and opens into said other housing chamber and the other of which extends through said other chamber and opens into said one chamber, and means mounted on said housing and operable to actuate said valves in seriatim whereby communication between said other chamber and said housing outlet is effected after said housing-outlet valve is retracted.

FLOYD A. BLASHFIELD.